Aug. 13, 1963
C. S. PEDERSEN
3,100,623
MOLD POSITIONING JACK FOR HORIZONTAL
INJECTION MOLDING MACHINE
Filed April 4, 1961
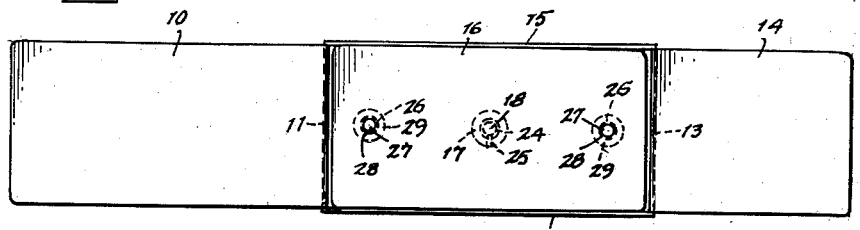
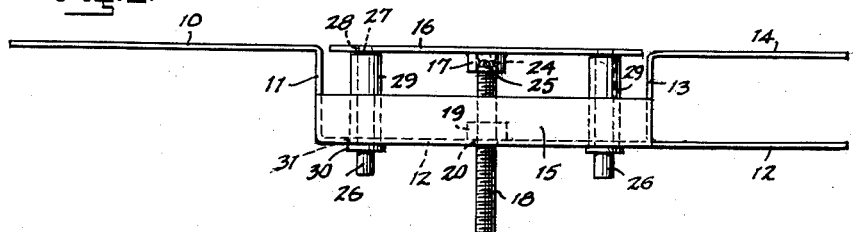
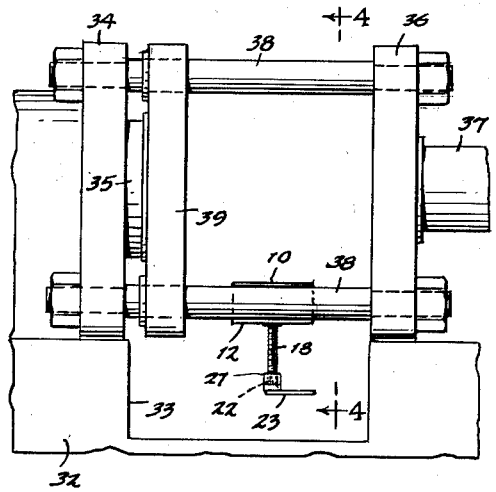
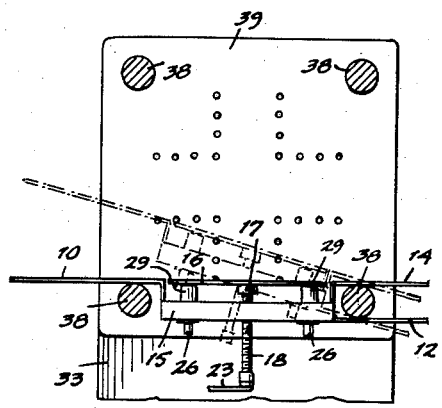
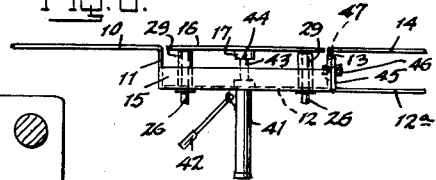
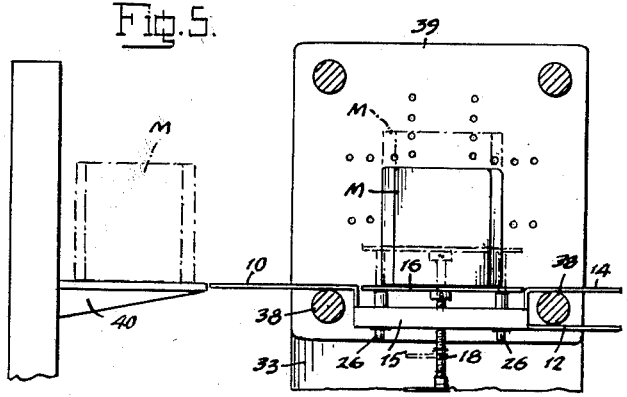
INVENTOR.
CLARENCE S. PEDERSEN
BY
ATTORNEY.

3,100,623
MOLD POSITIONING JACK FOR HORIZONTAL INJECTION MOLDING MACHINE
Clarence S. Pedersen, Trumbull, Conn., assignor to Durasplastics, Inc., Bridgeport, Conn., a corporation of Connecticut
Filed Apr. 4, 1961, Ser. No. 100,647
3 Claims. (Cl. 254—98)

The present invention relates to a mold positioning jack for horizontal injection molding machines, and has for an object to provide a jack which may be readily engaged with or removed from the injection molding machine, and which facilitates the installation or removal of molds in relation to the vertical faces of the horizontally opposed mold supporting plates of the molding machine.

In the conventional type of horizontal injection molding machine one of the two opposed mold supporting plates is fixed and the other is horizontally movable relative to the fixed plate upon four horizontal tie-rods connected between the fixed plate and the cylinder end of a hydraulic clamp or ram connected to the movable plate. The usual practice in installing or removing the molds is to rig an overhead chain hoist in position to lower or raise the mold and to maneuver it into or out of place in the vertical space between the opposed mold supporting plates, the mold being supported by the chain hoist as it is fastened or unfastened in relation to the mold supporting plates. This is an extremely awkward, difficult, and time-consuming operation because of the necessity during the installation or removal of maneuvering the mold in the free space between the vertical faces of the mold supporting plates.

It is proposed according to the invention to provide a jack which may be supported upon the two lower horizontal tie-rods, and which includes a transfer platform to which a mold may be moved directly from a lift truck or the like into position between the opposed mold plates, and further to provide an elevating platform upon which the mold is received from the transfer platform and which may be vertically raised and lowered to accurately align or center the mold parts with the mold supporting plates and to support them as they are clamped or bolted into place. By reversing the procedure the mold may be removed from the molding machine to the lift truck or the like.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a top plan view of the jack according to the invention;

FIG. 2 is a side elevation;

FIG. 3 is a side elevation of the intermediate part of a conventional horizontal injection molding machine with the jack in place upon the lower tie-rod;

FIG. 4 is a vertical transverse sectional view taken along the line 4—4 of FIG. 3, and showing in dot-and-dash lines the position of the jack as it is being installed or removed;

FIG. 5 is a transverse sectional view similar to FIG. 4, showing a lift truck in relation to the jack and a mold in position upon the jack, the dot-and-dash lines showing the mold upon the lift truck as well as in an elevated position in centered relation to the mold plate;

FIG. 6 is a side elevation on a reduced scale of a modified form of the jack.

Referring to the drawings, and more particularly to FIGS. 1 and 2, the jack according to the embodiment of the invention illustrated therein comprises a frame including a horizontal transfer platform 10, a first vertical end wall 11 bent downwardly from the inner end of the platform 10, and a horizontal base wall 12 bent laterally from the lower end of the end wall 11. At an intermediate point of the base wall 12 there is secured as by welding the lower edge of a second vertical end wall 13 in opposed spaced relation to the first end wall 11 and having a horizontal top wall 14 bent from its upper end and disposed in the horizontal plane of the transfer platform 10. The top wall 14 is vertically opposed to the extended end portion of the base wall 12 and with the end wall 13 forms an open end fork-like structure for engaging one of the tie-rods of the molding machine, as will presently more fully appear. Side wall members 15—15 are secured as by welding to the side edges of the end walls 11 and 13 and the base wall 12 and form with these walls a rigid box-like intermediate part of the frame structure in which the elevating means of the invention is disposed.

The elevating means comprises a rectangular elevating platform 16, preferably of corresponding width to the transfer platform 10 and spanning the space between the end walls 11 and 13, having a socket member 17 secured centrally at its under side, this socket member preferably being formed by an apertured plate or ring welded to the platform. The upper end of an elevating screw 18 is rotatably engaged in the socket member and has threaded engagement in a nut 19 secured as by welding to the base wall 12, the screw being extended downwardly through a hole 20 in the base wall and being provided at its lower end with a socket member 21 to which a ratchet wrench or other suitable means for manually rotating the screw may be attached. For instance, the socket member may be provided wtih a hexagonal socket 22 for receiving the hexagonal stud of a conventional ratchet type wrench 23 as shown in FIGS. 3 and 4. The upper end of the elevating screw within the socket 17 is provided with an annular groove 24 engaged by a set-screw 25 to prevent separation of the platform from the elevating screw. Normally the elevating platform 16 is disposed in flush relation with the transfer platform 10 so that a mold M may be slid thereon from the transfer platform and thereupon through rotation of the screw 18 the elevating platform may be raised to position the mold in the desired relation to the mold supporting plates, as will presently more fully appear.

Vertical guide pins 26—26 are rigidly secured at the under side of the elevating platform 16, preferably by means of threaded stud ends 27 upon the upper ends of the pins 26 screwed into threaded holes 28 in the platform, and are slidably engaged in sleeves 29 rigidly secured to the base wall 12 as by welding their flanged lower ends 30 in apertures 31 in the base wall. These guide pins effectually prevent tilting and turning of the elevating platform as it is raised and lowered thus facilitating the operation of the elevating screw 18. The upper ends of the sleeves also provide stops to position the elevating platform in flush relation with the platform 10.

The horizontal injection molding machine with which the jack of the invention is adapted to be cooperatively used is of conventional type and comprises a base 32, provided at an intermediate point with a clearance space 33. At one side of this space there is fixedly mounted the cylinder end 34 of a hydraulic clamp or ram 35, and at the other side there is fixedly mounted a mold supporting plate 36 having a connection 37 with an injection heater for supplying plastic material to the mold, the head end 34 and the mold supporting plate 36 being connected by four tie-rods 38 upon which a movable mold supporting plate 39 is slidably mounted for reciprocation by the ram 35 to which it is connected.

The jack of the invention is adapted to be supported upon the two lower tie-rods 38, and is conveniently engaged therewith as shown by the dot-and-dash lines in FIG. 4 by sliding its fork-like end upon the far tie-rod and allowing the transfer platform 10 to rest upon the near tie-rod with the elevating platform 16 disposed between the two tie-rods and the elevating screw extending downwardly in the clearance space 33.

In the engaged position the jack is prevented from tilting as the weight of a mold is imposed upon the outer end of the transfer platform 10 by the locking engagement of its fork-like end with the far tie-rod. In the operation of placing a mold in the machine a lift truck 40 carrying the mold may be brought into level relation with the outer end of the transfer platform 10 as shown in FIG. 5, and thereupon slid from the lift truck onto the platform 10 and then on to the elevating platform 16. If necessary, the jack may then be slid longitudinally along the tie-rods to bring it into contiguous relation with one or the other mold supporting plates. By turning the elevating screw 18 through operation of the ratchet wrench 23 the elevating platform may be raised to bring the mold to a selected position of vertical adjustment in exact mounting relation with the mold supporting plate, whereupon it may be secured in place by the conventional clamps, bolts, or the like while it is supported by the elevated platform. Upon securing of the mold the elevating platform may be lowered and the jack readily removed by lifting it to the position as shown in dot-and-dash lines in FIG. 4 and sliding it out of place. The operation of removing a mold is carried out by reversing the procedure.

In FIG. 6 there is shown a modification in which a hydraulic jack is substituted for the elevating screw 18 of the first embodiment, the hydraulic jack consisting of a cylinder 41 rigidly secured to the base wall 12 and provided with an operating lever 42 and a plunger rod 43 having its upper end engaged in the socket member 17 and secured by a set screw 44.

In FIG. 6 there is also illustrated a modification of the fork end of the jack frame wherein an outer base wall member 12a is provided in place of the extended end of the base wall 12 as in the first embodiment, the member 12a having at its inner end an upwardly bent vertical wall 45 provided with a bolt 46 secured in a vertical slot 47 in the end wall 13. Thus the member 12a may be vertically adjusted relative to the top wall 14 to accommodate the jack to various diameter tie-rods 38. Obviously this modified form of fork end may be employed with the elevating screw arrangement of the first embodiment.

What is claimed is:

1. A mold positioning jack, for removable assembly with a horizontal injection molding machine or the like, having longitudinally spaced transversely disposed vertical plates for the mounting of a mold thereon, and a pair of transversely spaced horizontal tie-rods extending longitudinally across the space between said plates, said jack comprising:
   (a) a frame including
       (a-1) a horizontal transfer platform at one end for transverse engagement with the upper side of one tie-rod and of a length to extend transversely outwardly therefrom,
       (a-2) a horizontal top wall at the other end for transverse engagement with the upper side of the other tie-rod,
       (a-3) a first end wall joined to and extending downwardly from the inner end of said transfer platform for disposition inwardly adjacent said one tie-rod,
       (a-4) a second end wall joined to and extending downwardly from the inner end of said top wall for disposition inwardly adjacent said other tie-rod,
       (a-5) a base wall joined to and extending between said end walls in downwardly offset relation to said transfer platform, and
       (a-6) a bottom wall for disposition at the lower side of said other tie-rod joined to and extending outwardly from said second end wall in vertically opposed spaced relation to said top wall and defining therewith a tie-rod receiving space open at its outer end for the passage of said other tie-rod into and out of said space;
   (b) a horizontal elevating platform disposed between said end walls in vertically opposed relation to said base wall and normally horizontally aligned with said transfer platform for receiving a mold from said transfer platform and supporting it between said plates; and
   (c) elevating means carried by said base wall and engaged with said elevating platform for vertically raising and lowering said elevating platform relatively to its said position of horizontal alignment with said transfer platform to bring a mold supported thereon to selected positions of vertical adjustment in the space between said plates.

2. The invention as defined in claim 1, further characterized by a vertically adjustable connection between said second end wall and said bottom wall for vertically adjusting the distance between said top and bottom walls.

3. The invention as defined in claim 1, further characterized by stop means cooperatively arranged between said frame and said elevating platform to limit the lowering of the latter to a position in horizontal alignment with said transfer platform.

References Cited in the file of this patent
UNITED STATES PATENTS

| | | |
|---|---|---|
| 758,493 | Abbey | Apr. 26, 1904 |
| 1,656,382 | McColley | Jan. 17, 1928 |
| 1,847,719 | Hirschel | Mar. 1, 1932 |
| 2,124,314 | Robison et al. | July 19, 1938 |
| 2,496,016 | Nelson | Jan. 31, 1950 |
| 2,543,296 | Meredith | Feb. 27, 1951 |
| 2,592,845 | Aron | Apr. 15, 1952 |
| 2,797,455 | Schrecongost | July 5, 1957 |